United States Patent
Jäggle et al.

(10) Patent No.: US 11,480,257 B2
(45) Date of Patent: Oct. 25, 2022

(54) VALVE ARRANGEMENT, IN PARTICULAR A REFLUX VALVE WITH A PRESSED-IN BALL HOLDER

(71) Applicant: Schwäbische Hüttenwerke Automotive GmbH, Aalen-Wasseralfingen (DE)

(72) Inventors: Gerd Jäggle, Ertingen (DE); Michael Ehringer, Bad Schussenried (DE); Georg Wiebel, Wolpertswende (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 14 days.

(21) Appl. No.: 17/144,449

(22) Filed: Jan. 8, 2021

(65) Prior Publication Data

US 2021/0215265 A1 Jul. 15, 2021

(30) Foreign Application Priority Data

Jan. 13, 2020 (DE) .................... 10 2020 100 590.3

(51) Int. Cl.
*F16K 15/04* (2006.01)
*F16K 27/02* (2006.01)

(52) U.S. Cl.
CPC .......... *F16K 27/0209* (2013.01); *F16K 15/04* (2013.01)

(58) Field of Classification Search
CPC .............................. F16K 15/04; F16K 27/0209
USPC ..................................................... 137/533.11
See application file for complete search history.

(56) References Cited

U.S. PATENT DOCUMENTS

| 4,945,947 A | 8/1990 | Westra et al. |
| 6,035,890 A | 3/2000 | Massicotte |
| 8,627,847 B2 * | 1/2014 | Montague ................. E03B 9/16 |
| | | 137/300 |
| 2003/0127140 A1 | 7/2003 | Warlick |
| 2007/0215217 A1 * | 9/2007 | Goodhope .............. F16K 47/10 |
| | | 137/512.1 |

(Continued)

FOREIGN PATENT DOCUMENTS

| DE | 4016874 A1 | 11/1990 |
| DE | 69922191 T2 | 7/2005 |

(Continued)

OTHER PUBLICATIONS

German Search Report issued in German Application No. 10 2020 100 590.3, dated Sep. 1, 2020, 6 pages.

*Primary Examiner* — P. Macade Nichols
(74) *Attorney, Agent, or Firm* — RatnerPrestia (57) ABSTRACT

A valve arrangement to allow a fluid flow in a first direction and block it in a second direction opposite the first direction. The valve arrangement includes: a fluid channel, a valve seat and a closing body arranged in the fluid channel. The closing body prevents fluid flow in the second direction when resting against the valve seat and allows fluid flow in the first direction when the closing body is lifted off the valve seat; a closing body holder in the fluid channel configured to restrict movement of the closing body in the first direction when the closing body is lifted off the valve seat. The closing body holder held on an inner circumferential wall of the fluid channel in a frictional fit and/or movable in the first direction in a position in which the closing body holder is held on an inner circumferential wall of the fluid channel.

18 Claims, 3 Drawing Sheets

(56) References Cited

U.S. PATENT DOCUMENTS

2020/0102924 A1* 4/2020 Perry ................ F02M 63/0071

FOREIGN PATENT DOCUMENTS

| DE | 202016100946 U1 | 5/2016 |
| DE | 102017219004 A1 | 4/2019 |
| EP | 2647827 A1 | 10/2013 |

* cited by examiner

VALVE ARRANGEMENT, IN PARTICULAR A REFLUX VALVE WITH A PRESSED-IN BALL HOLDER

CROSS-REFERENCE TO RELATED APPLICATIONS

The application claims the priority of German patent application DE 10 2020 100 590.3, filed on Jan. 13, 2020 with the German Patent and Trademark Office.

FIELD OF THE INVENTION

The invention relates to a valve arrangement which is adapted to allow a fluid flow in a first direction, in particular a flow direction, and to block it in a second direction, in particular a flow direction which is opposite to the first direction. The valve arrangement can be designed as a reflux valve or at least act as a reflux valve. The valve arrangement can be adapted to be used or installed in a delivery pump. The invention therefore also relates to a delivery pump which comprises such a valve arrangement. The pump can for example be an oil or fuel pump. The pump can for example supply fluid to a hydraulic motor or a gear system, such as for example a vehicle gear system or a gear system of a motor vehicle, in particular in order to lubricate and/or cool and/or actuate components of the gear system. It can for example form a gear unit with the gear system or can be fastened to a gear system or at least connected to the gear system in terms of flow and in particular in fluid communication. The pump can in principle be used to supply an internal combustion engine, in particular an internal combustion engine of a motor vehicle, with fluid, in particular in order to lubricate and/or cool it. The pump can be part of a pump-motor unit. The pump-motor unit can comprise an electric motor for driving the pump. The pump and the electric motor can together form a unit which can be handled as a unit and/or fastened to other components, such as for example said gear system.

BACKGROUND OF THE INVENTION

Reflux valves for pumps are known as such in the prior art. DE 10 2017 219 004 A1, incorporated herein by reference, for example discloses a reflux valve, embodied without a valve spring, for an oil pump operated by an electric motor. The reflux valve has a spherical closing body which is arranged in an outlet channel of the pump. The closing body is prevented from falling out of an outlet opening of the outlet channel by a closing body holder which is introduced into the outlet channel via the outlet opening during assembly and snaps onto an inner wall of the outlet channel in a positive fit. Once snapped on, the closing body holder rests against a shoulder of the outlet channel, thus preventing a movement of the closing body holder counter to the flow direction. A movement of the closing body holder in the flow direction is prevented by join contours of the closing body holder which rest against an undercut edge formed by the inner circumference of the fluid channel. When assembling the closing body holder, it must always be ensured that the latter is securely snapped onto the housing, whereby corresponding undercuts must be created in the outlet channel and special demands are made on the inner contour of the outlet channel and the closing body holder with regard to dimensional accuracy.

SUMMARY OF THE INVENTION

An aspect of the present invention is based on providing a valve arrangement comprising a closing body holder which is easy to manufacture and assemble. Another aspect is to provide a delivery pump comprising such a valve arrangement.

An aspect of the invention is based on a valve arrangement, in particular a reflux valve, which is adapted to allow a fluid flow in a first direction and to block it in a second direction which is opposite to the first direction. The first direction can for example point from a pump chamber of a delivery pump to a consumer. The second direction can for example point from a consumer or another pump, for example in a system which has a main pump and an additional or auxiliary pump, to the pump chamber. In order to prevent fluid from being discharged or from flowing away from the pump chamber via the fluid channel while the pump is in operation, the valve arrangement is provided which allows the fluid to flow in the first direction and blocks it in the second direction in order to prevent fluid from flowing back into the pump chamber. The pump can be disconnected by the valve arrangement, wherein the fluid pressure, which can occasionally reach relatively high values, is held in the fluid system which is arranged after the valve arrangement in the first direction.

The valve arrangement comprises: a fluid channel, in particular an outlet channel; a valve seat, which can in particular be formed in the fluid channel; and a closing body which is arranged in the fluid channel and is for example rotationally symmetrical or spherical. The fluid channel can for example connect a pump chamber of the delivery pump to the outlet opening which is for example formed by a pump housing and via which the fluid channel opens outwards. The fluid channel can be formed by a pump housing of the delivery pump or by a separate component which is attached to the pump housing. A valve seat can be arranged in the fluid channel. The valve seat can be formed by an inner circumferential wall of the part which forms the fluid channel, for example the separate component or the pump housing. Alternatively, the valve seat can be formed via a separate component which is inserted into the fluid channel. The valve seat can for example have a conical segment-shaped or spherical segment-shaped inner circumferential wall which forms the valve seat for the closing body. When the closing body rests against the valve seat, in particular the conical segment-shaped or spherical segment-shaped circumferential wall, in particular circumferentially, the fluid flow in the second direction is blocked. The fluid which is arranged after the closing body with respect to the first direction can in particular press the closing body against the valve seat, for example when the pressure in the fluid after the closing body is higher than in the fluid before the closing body.

If fluid flows in the first direction or the pressure before the closing body is higher than after the closing body, the closing body is lifted off the valve seat and fluid can flow in the first direction.

In general terms, the closing body is configured to prevent a fluid flow in the second direction in a position in which it rests against the valve seat and to allow a fluid flow in the first direction when the closing body is at least partially or completely lifted off the valve seat.

The closing body can be designed to be rotationally symmetrical, such as for example conical or frustoconical, or can form at least one segment which is provided for resting against the valve seat and the outer surface of which forms part of a conical surface area. In an advantageous embodiment, the closing body is a sphere or forms at least one segment which is provided for resting against the valve seat and the outer surface of which forms part of a spherical surface.

The valve arrangement also comprises a closing body holder which is arranged in the fluid channel and configured to restrict a movement of the closing body in the first direction in a position of the closing body in which the closing body is lifted off the valve seat. The closing body can for example rest against or contact the closing body holder when the closing body is in a position in which it is lifted off the valve seat. The valve body can for example be freely movable between the position in which the closing body rests against the valve seat and a position in which the closing body rests against the closing body holder. The valve arrangement can in particular be designed without a valve spring, i.e. the valve arrangement dispenses with a spring acting on the closing body. The closing body can be arranged without being spring-loaded, or the valve arrangement can be designed as a reflux valve with no spring. The closing body can for example not rest against the closing body holder or can be distanced from the closing body holder or can be without any mechanical interaction with the closing body holder when the closing body is in the position in which it rests against the valve seat. Contrary to a valve arrangement in which a valve spring is supported on the closing body holder and the closing body in order to press the latter from the valve body holder to the valve seat, whereby a mechanical interaction exists between the closing body and the closing body holder, there is no mechanical interaction between the closing body and the closing body holder in a valve with no valve spring when the closing body is in the position in which it rests against the valve seat.

It is generally preferred if the closing body can be arranged between the valve seat and the closing body holder. The valve arrangement can have an accommodating space which is formed or arranged between the valve seat and the closing body holder and in which the closing body is arranged. The accommodating space can have an inner circumferential wall which is formed by the pump housing or the part which forms the fluid channel and/or circumferentially encloses the accommodating space. An inner diameter of the accommodating space can be larger than an inner diameter of the fluid channel before and in particular immediately before the valve seat or at the transition to the valve seat.

The outer diameter of the closing body, in particular the rotationally symmetrical or spherical closing body, can be smaller than the inner diameter of the accommodating space and larger than the inner diameter of the segment of the fluid channel before the valve seat and in particular immediately before the valve seat or at the transition to the valve seat.

The closing body holder can be held on an inner circumferential wall of the fluid channel, for example a closing body holder receptacle, in a frictional fit and in particular a surmountable frictional fit. Alternatively or additionally, the closing body holder can be held on the inner circumferential wall of the fluid channel, for example the closing body holder receptacle, in a positive fit and in particular a surmountable positive fit, wherein "surmountable" means in particular that the holding force of the frictional-fit or positive-fit connection can be surmount by a force which is caused by the fluid flow in the fluid channel and acts on the closing body holder, in particular directly and indirectly (for example via the closing body), while the delivery pump is in operation, in order to release the positive-fit or frictional-fit connection and move the closing body holder.

The closing body holder can be held fixedly on the inner circumferential wall in a frictional or positive fit, such that it cannot be moved relative to the inner circumferential wall, at least on the basis of the forces acting on it while the pump is in operation. Preferably, however, the closing body holder is fixedly held on the inner circumferential wall of the fluid channel, in particular the closing body holder receptacle, in a surmountable frictional or positive fit, such that it can be moved or movable in the first direction relative to the inner circumferential wall, in particular by the forces acting on the closing body holder while the pump is in operation, i.e. the closing body holder can be moved in the first direction in a position in which the closing body holder is held on the inner circumferential wall of the fluid channel, in particular in a frictional and/or surmountable positive fit. The closing body holder can for example be movable in the first direction from a first holding position, in which it is held in a frictional or surmountable positive fit on the inner circumferential wall of the fluid channel and/or closing body holder receptacle, which can for example be formed by the fluid channel, in particular by the forces generated by the fluid flow and acting on the closing body holder and the closing body resting against the closing body holder during delivery operations, into a second holding position in which a movement of the closing body holder in the first direction is blocked. When the closing body holder is in its first holding position, a movement of the closing body holder in the second direction can for example be prevented by the frictional-fit or surmountable positive-fit connection between the closing body holder and the inner circumferential wall and/or by an insurmountable positive-fit connection between the closing body holder and the fluid channel, in particular by the fluid channel having an abutting or axial abutting surface against which the closing body holder rests or can rest in its first holding position. In the second holding position, the closing body holder can for example be blocked from moving in the first direction in a positive fit, in particular an insurmountable positive fit. In the second holding position, the closing body holder can for example rest against a separate component, which is separate from the component which forms the fluid channel, such as for example a housing or second housing. The pump housing, which in embodiments can form the fluid channel, or the delivery pump can be fastened to the separate component or the second housing. In particular, because the closing body holder rests against the separate component in the second holding position, the closing body holder can be prevented from moving further in the first direction, even when the closing body holder and the closing body holder receptacle expand to different extents, for example due to changing operational temperatures of the delivery pump or the fluid to be delivered, for example when they are formed from different materials or have different coefficients of thermal expansion.

Alternatively or additionally, the separate component can be a component which is fastened to the pump housing and which is separate from the pump housing and the closing body holder. The component can optionally be arranged in the fluid channel and/or fastened to the fluid channel, for example to an inner circumferential wall of the fluid channel.

A surmountable positive-fit connection can for example be formed by the inner circumferential wall having a recess and the closing body holder having a projection which engages the recess, or the inner circumferential wall having a projection and the closing body holder having a recess which the projection engages, wherein the projection is pressed out of the recess by exerting an axial force, caused in particular by the fluid flow, on the closing body holder, for example by elastically or plastically deforming the projection or arranging the projection elastically or resiliently.

In embodiments, a segment of the closing body holder can protrude out of the fluid channel or the pump housing when the closing body holder is arranged in the closing body holder receptacle, in particular when the closing body is situated in its first holding position and/or second holding position. In the second holding position, and optionally in the first holding position, the closing body holder can for example protrude partially into the second housing, for example into the gear housing to which the pump-motor unit is fastened.

In the second holding position, the closing body holder can additionally be held in a frictional or positive fit, for example on the inner circumferential wall of the fluid channel or on the inner circumferential wall of the closing body holder receptacle, in order to prevent a movement of the closing body holder in the second direction relative to the inner wall.

In embodiments, the closing body holder can be formed from plastic and can in particular be an injection-molded part. The closing body holder can thus be produced easily and cost-effectively and meet the structural and functional demands placed on it.

The advantage of the arrangement in accordance with an aspect of the invention is that the press-in force of the closing body holder only needs to be designed for transporting the delivery pump, i.e. the holding force only needs to be sufficient for transport. The closing body holder can thus in certain circumstances be inserted into the fluid channel by hand without using tools. For its assembly, the closing body is inserted into the accommodating space of the valve arrangement, and the closing body holder is then inserted into the fluid channel, in particular into the closing body holder receptacle, to form a frictional fit, in particular a surmountable frictional fit, or a positive fit, in particular a surmountable positive fit, with the inner circumferential wall. The closing body holder and the closing body are prevented from falling out by the frictional fit or surmountable positive fit between the inner circumferential wall and the closing body holder. The delivery pump can thus be easily transported and mounted on the additional or second housing without having to pay particular attention to the closing body and/or the closing body holder. Conversely, the closing body holder is easy to manufacture, since only low dimensional-accuracy demands are placed on it. In addition, the closing body holder is easy be mount on the fluid channel, since it does not need to latch into place or non-detachably latch into place. The fluid channel is therefore easier to produce, because it does not need to have any undercuts to be non-detachably latched onto.

The distance which the closing body can move from the position in which it rests against the valve seat to a position in which the closing body rests against the closing body holder can be larger in the second holding position of the closing body holder than in the first holding position of the closing body holder. Alternatively or additionally, the space between the valve seat and the closing body holder can be larger in the second holding position than in the first holding position. The space can in particular increase by the distance which the closing body holder can be moved from the first holding position into the second holding position. If the closing body is moved into contact with the closing body holder and/or rests against the closing body holder when the closing body holder is in its first holding position, the movement of the closing body is at least restricted, wherein the closing body and the closing body holder can be moved together in the first direction into the second holding position of the closing body holder, in particular by surmounting the frictional force generated by the frictional fit between the closing body holder and the inner circumferential wall or the holding force generated by the surmountable positive fit between the closing body holder and the inner circumferential wall. In the second holding position of the closing body holder, the movement of the closing body in the first direction is restricted in such a way that a movement of the closing body in the first direction is blocked and not only impeded.

It is generally preferred if the closing body holder is held in the second holding position in a frictional fit on the inner circumferential wall of the fluid channel or the closing body holder receptacle, in order for example to prevent the closing body holder from moving in the second direction. Alternatively or additionally, it is preferred if the closing body holder is held in a positive fit in the fluid channel or in a component which is separate from the inner wall of the fluid channel, for example the second housing, on which the closing body holder is supported in the first direction and/or against which the closing body holder rests in the first direction, in order to prevent the closing body holder from moving in the first direction when the closing body holder is in its second holding position.

The frictional or positive fit between the inner wall and the closing body holder can for example be adapted or configured such that the force required to surmount the frictional or positive fit is greater than the sum of the weight forces of the closing body holder and the closing body. This makes it possible to prevent the closing body holder and the closing body from falling out of the accommodating space and/or the closing body holding segment or from being moved out of the first holding position.

Alternatively or additionally, the frictional or positive fit between the inner wall and the closing body holder can be adapted or configured such that the force required to surmount the frictional or positive fit is smaller than a force which is or can be exerted on the closing body by the fluid flow pointing in the first flow direction in the fluid channel. This means that the closing body holder can be moved from the first holding position into its second holding position by the fluid flow.

The closing body holder can have a holding segment, in particular an annular holding segment, using which the closing body holder is held on the inner circumferential wall of the fluid channel, in particular the inner circumferential wall of the closing body holder receptacle, in a surmountable frictional fit or a surmountable positive fit. The annular holding segment and/or the closing body holder itself can for example have an outer diameter which is larger than the length of the holding segment and/or closing body holder by which it extends in the longitudinal direction of the fluid channel. The closing body holder therefore requires only a little installation space.

The closing body holder can optionally have one or more projections, in particular stays, which protrude inwardly from an inner circumference of the annular holding segment. The inwardly protruding projections can for example be connected to one another in the region enclosed by the annular holding segment and in particular in its center. Alternatively, the inwardly projecting projections can each form an inwardly projecting free end, wherein the free ends of the inwardly projecting projections are not connected. The free ends of the inwardly protruding projections can for example enclose a passage.

The closing body holder can expediently be configured in order for the fluid flow flowing through the fluid channel to flow through the closing body holder. The fluid flow can in particular flow through the region enclosed by the annular holding segment and for example flow around the protrusion (s) protruding inwardly from the annular holding segment. The fluid flow can for example flow through the closing body, in particular between adjacent projections. The valve arrangement, in particular the closing body and the closing body holder, are preferably designed such that the fluid flow can flow through the closing body holder, in particular in the first direction, in particular when the closing body rests against the closing body holder, for example against the at least one projection. This ensures that the closing body cannot block the fluid flow in the first direction when it rests against the closing body holder.

The closing body can for example rest against the one or more projections when the closing body holder restricts or blocks the movement of the closing body, i.e. the closing body can rest against the at least one projection and move the closing body holder from the first holding position into the second holding position by surmounting the force of the frictional-fit connection between the closing body holder and the inner wall, due to the force exerted by the flow on the closing body. When the closing body holder is in its second holding position, the closing body can rest against the at least one projection, wherein the closing body holder and/or its at least one projection blocks the movement of the closing body in the first direction.

Alternatively or additionally, the one or more projections can form a recess on the side facing the valve seat, in which the closing body can be partially accommodated, in particular when the closing body rests against the at least one projection. Due to the recess, the closing body can prevent or impede lateral movements when the valve arrangement and/or delivery pump is being transported, i.e. movements of the closing body transverse to the flow direction or the longitudinal direction of the fluid channel. Rattling noises in particular can thus be avoided.

Another aspect of the invention relates to a delivery pump which comprises the valve arrangement described herein. The delivery pump can for example be embodied as a rotary vane pump, a pendulum vane pump, a vane cell pump or a gear pump, i.e. an internal gear pump or an external gear pump. The delivery pump also comprises a pump chamber and a delivery element which can be rotated about an axis of rotation and which is arranged in the pump chamber. By rotating the delivery element about the axis of rotation, the delivery pump can deliver fluid from an inlet channel into an outlet channel. Fluid can be delivered from the pump chamber to the outlet opening, in particular by rotating the delivery element about the axis of rotation, via the fluid channel which preferably forms the outlet channel and for example opens onto the pump chamber at one end and onto the outlet opening at its other end. The valve arrangement is arranged in the fluid channel or is at least partially formed by the fluid channel.

The delivery pump can have a first housing, which forms the fluid channel, namely a first fluid channel or outlet channel, and a second housing to which the first housing is fastened. As described further above, the second housing can for example be a gear housing or another housing. The second housing can have a second fluid channel comprising an inlet or inlet opening which is arranged in accordance with the outlet or outlet opening of the first fluid channel. This enables fluid to flow from the first fluid channel into the second fluid channel. The second fluid channel can in particular lead to a fluid consumer.

The closing body holder can be moved in the first direction from its first holding position, in which it is held on the inner wall of the first fluid channel and/or its closing body holder receptacle in a surmountable frictional fit or a surmountable positive fit, into the second holding position in which a movement of the closing body holder in the first direction is blocked because the closing body holder rests axially against the second housing or against a part inserted on the second housing. In the second holding position, this establishes a positive fit between the closing body holder and the second housing, which blocks a movement of the closing body holder in the first direction.

A gasket which can for example be arranged between the first housing and the second housing circumferentially surrounds the region between the outlet opening of the first fluid channel and the inlet opening of the second fluid channel and seals off the fluid connection between the first fluid channel and the second fluid channel from the outside.

The gasket can for example circumferentially surround the closing body holder when the closing body holder is in its second holding position.

The intended installation position of the delivery pump can for example be such that the outlet opening of the first fluid channel opens onto the lower side of the first housing in relation to the direction of gravity. This can mean that the closing body rests against the closing body holder or its at least one projection or in the recess formed by the at least one projection due to gravity.

The inlet opening of the second housing can for example open onto the upper side of the second housing in relation to the direction of gravity. The inlet opening of the second fluid channel can thus advantageously be aligned with the outlet opening of the first fluid channel, or vice versa.

In embodiments, the longitudinal direction of the first fluid channel can be arranged to be parallel or coincident or oblique with respect to the longitudinal direction of the closing body holder receptacle. The longitudinal direction of the closing body holder receptacle can for example be arranged to be parallel or coincident with respect to the longitudinal direction of the second fluid channel.

The invention has been described on the basis of a number of example embodiments. An embodiment of the invention is described below on the basis of figures. The features thus disclosed, individually and in any combination of features, advantageously develop the subject-matter of the invention.

DETAILED DESCRIPTION OF THE INVENTION

Figure 1:
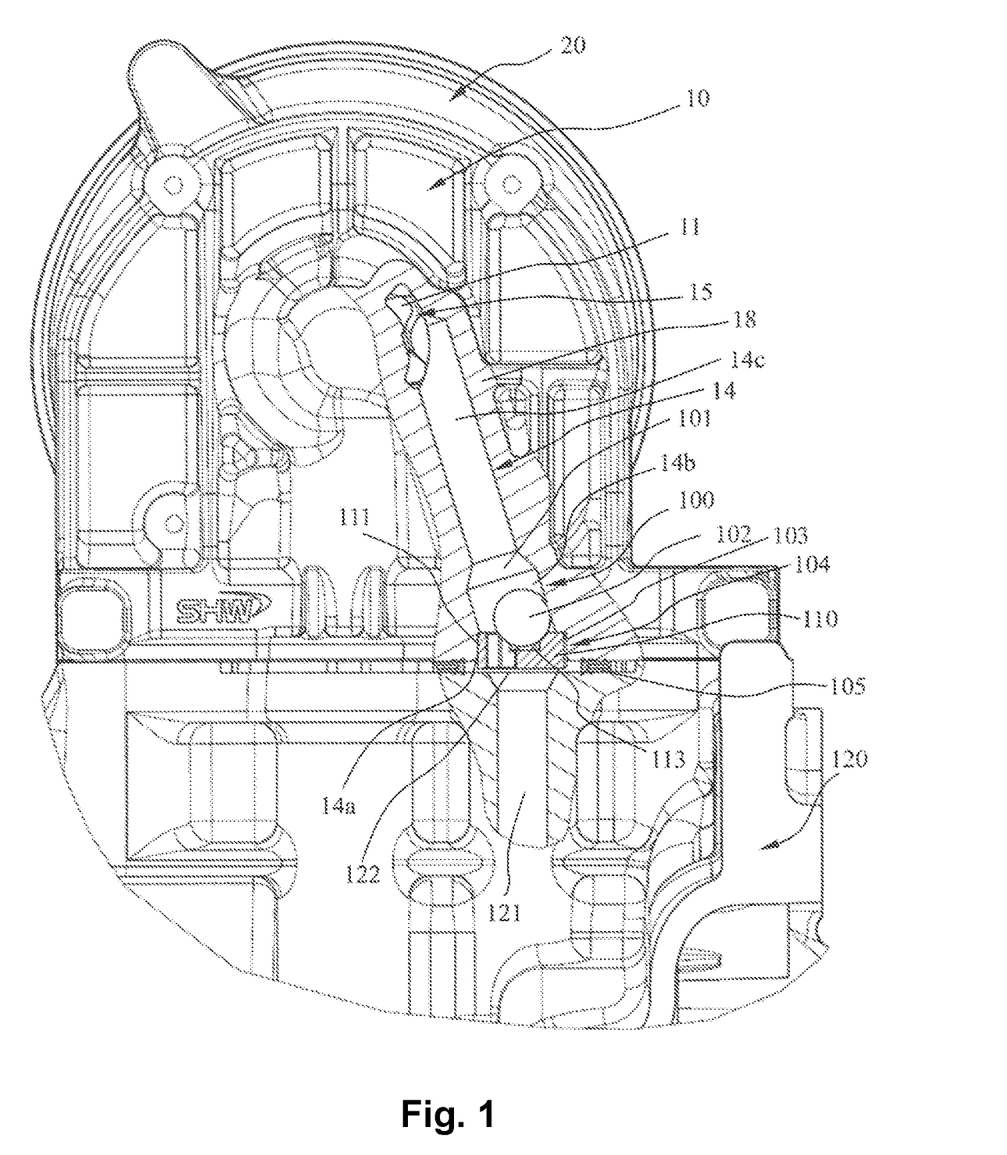
FIG. 1 shows a delivery pump which is fastened to a gear housing, wherein a valve arrangement is shown in a section.
Figure 2:
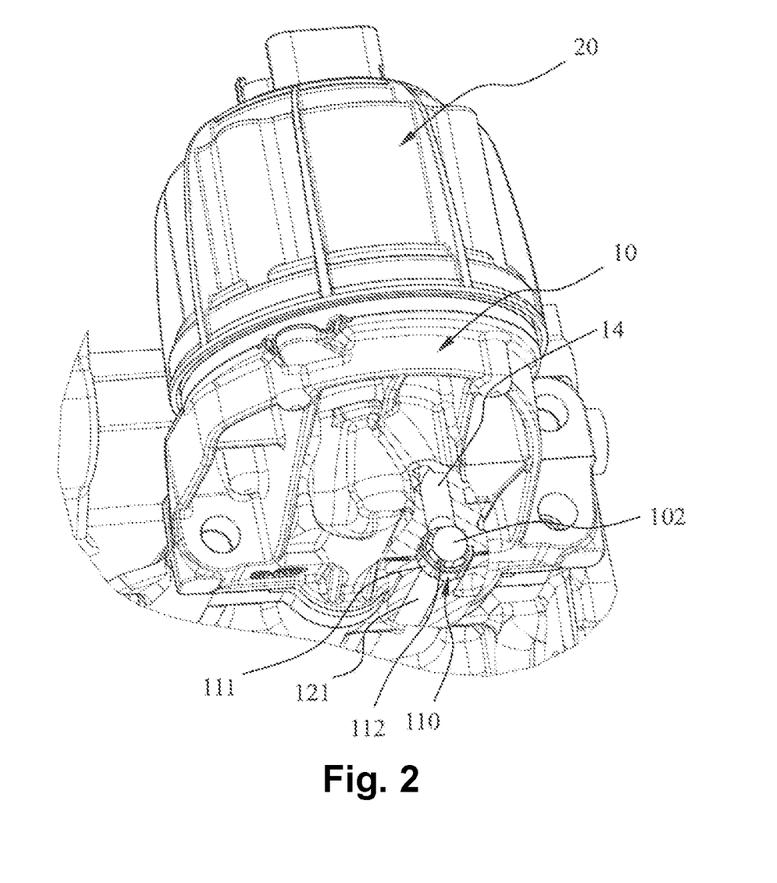
FIG. 2 shows the arrangement of FIG. 1 from a different perspective, wherein a closing body and a closing body holder of the valve arrangement are highlighted in a partial sectional representation.
Figure 3:
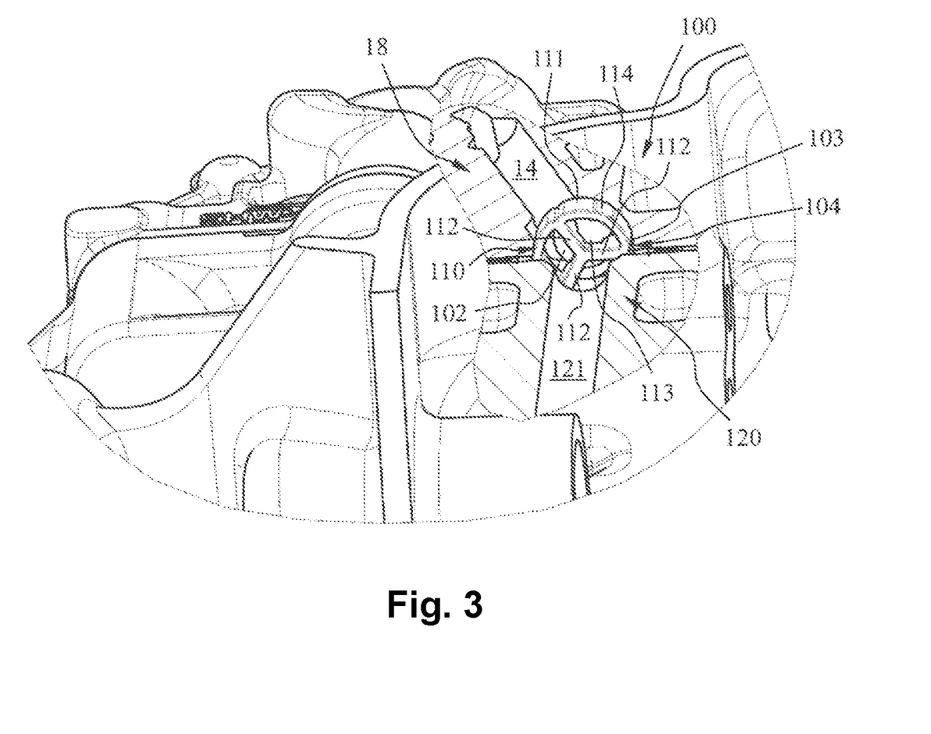
FIG. 3 shows the arrangement of FIG. 1 from yet another perspective, wherein the closing body and the closing body holder are highlighted in a partial sectional representation.

FIGS. 1 to 3 show a delivery pump 10 which is fastened to, in particular flanged onto, a second housing 120 which can for example be a gear housing. The delivery pump 10 is part of a pump-motor unit which comprises the delivery pump 10 and an electric motor 20 which is attached to an end face of the delivery pump 10. A rotor of the electric motor 20 and a delivery element 11 of the delivery pump 10 are coupled to one another such that rotating the rotor rotates the delivery element 11. The rotor and the delivery element 11 can in particular be non-rotationally connected to one another, i.e. the rotor and the delivery element 11 rotate at the same speed of rotation and in the same direction of rotation. Alternatively, a gear system can be arranged between the rotor and the delivery element 11, whereby the delivery element 11 rotates at a different speed of rotation and/or in a different direction of rotation than the rotor.

The delivery pump 10 has a housing 18 which forms a pump chamber 15 in which the delivery element 11, which can be rotated about its axis of rotation, is arranged. The housing 18 can comprise one or more parts, such as for example a housing base body which forms the pump chamber 15 and a housing cover which covers the pump chamber 15 at its end face, in particular from the electric motor 20. The delivery element 11 can be rotated relative to the housing 18.

The housing 18, for example a housing base body, forms a fluid channel 14 which opens into the pump chamber 15 at one end and onto an outlet opening 14a on an outer side, in particular a lower side, of the housing 18 at the other end. The second housing 120 forms a second fluid channel 121, an inlet opening 122 of which opens onto an outer side of the housing 120. The inlet opening 122 and the outlet opening 14a are arranged in accordance with one another, i.e. they at least partially or completely overlap, thus enabling fluid to be delivered from the pump chamber 15 to a fluid consumer via the fluid channel 14 and the fluid channel 121.

A valve assembly 100 is provided which is adapted to allow a fluid flow in a first flow direction of the fluid, namely from the pumping chamber 15 to the outlet opening 14a, and to block a fluid flow in a second flow direction which is opposite to the first direction. The valve arrangement 100 is therefore a reflux valve.

The fluid channel 14 forms a valve seat 101 which has an inner circumferential surface which in the example shown is designed to be frustoconical. In the first flow direction of the fluid to be delivered, the valve seat 101 is adjoined by an accommodating space 14b which is formed by the fluid channel 14 and in the example shown is designed to be cylindrical. The accommodating space 14b accommodates a spherical closing body 102, wherein the closing body 102 can move freely in the accommodating space 14b. In the first flow direction, the accommodating space 14b is adjoined by a closing body holder receptacle 104 which is formed by the fluid channel 14 and has an inner circumferential wall 103 which is designed by way of example to be cylindrical. The longitudinal axis of the closing body holder receptacle 104 is arranged obliquely with respect to the longitudinal axis of the accommodating space 14b and/or the valve seat 101 and/or the segment 14c of the fluid channel 14 which is between the pump chamber 15 and the valve seat 101 and which in particular adjoins the valve seat 101. The segment 14c, the valve seat 101 and the accommodating space 14b in particular have a common longitudinal axis. The fluid channel 121 and the closing body holder receptacle 104 can for example have a common longitudinal axis.

The valve arrangement 100 also has a closing body holder 110 which, in the embodiment shown in the figures, is held on the inner circumferential wall 103 of the fluid channel 14 and/or the closing body holder receptacle 104 in a surmountable frictional fit. The embodiment shown in the figures can alternatively be designed such that the closing body holder 110 is held on the inner circumferential wall 103 in a surmountable positive fit.

As can best be seen from FIGS. 2 and 3, the closing body holder 110 has an annular holding segment 111 via which the closing body holder 110 rests against and/or is held on the inner circumferential wall 103 of the closing body holder receptacle 104 in a frictional fit. In the example shown, the outer circumference of the annular holding segment 111 has a plurality of contact elements 114, in particular contact fields or contact projections, which are distributed over the circumference and hold the annular holding segment 111 in frictional-fit contact with the inner circumferential wall 103. At least three such contact elements 114 can for example be arranged over the circumference, preferably in a uniform distribution. The contact elements 114 support the closing body holder 110 on the inner circumferential wall 103 in a defined frictional fit. The segments of the outer circumference of the annular holding segment 111 which lie between the contact elements 114 do not therefore necessarily need to rest against the inner circumferential wall 103. In the example shown, these segments do not even rest against the inner circumferential wall 103, but rather only the contact elements 114.

A plurality of projections 112—in this example, three projections 112—project from an inner circumferential surface of the annular holding segment 111, for example radially inwards, and are connected to one another in the region enclosed by the annular holding segment 111, namely in its center. In the example shown, the inwardly protruding projections 112 are designed in the shape of stays. Alternatively, a free end of each of the projections 112 can protrude inwardly, for example radially inwards, such that the free ends are not connected.

On the side facing the valve seat 101, the projections 112 have a recess 113, which can best be seen in FIGS. 1 and 3. The recess 113 is formed, by way of example, in the center of the region enclosed by the annular holding segment 111. The recess 113 is designed such that it can partially accommodate the closing body 102 when the latter rests against the closing body holder 110 and/or the projections 112, as shown in FIG. 1. When the closing body 102 is arranged in the recess 113, lateral movements of the closing body 102 can be restricted, thus avoiding the closing body 102 rattling in the accommodating space 14b, which can be advantageous in particular when transporting and/or mounting the delivery pump 10. The regions formed between adjacent projections 112 in the circumferential direction are continuous from a first end to a second end of the closing body holder 110, such that the fluid flow can flow through the closing body holder 110, in particular in the first flow direction, even when the closing body 102 rests against the closing body holder 110, as shown in FIG. 1. As can best be seen from FIG. 3, a contact element 114 is arranged approximately centrally between each two adjacent projections 112 on the outer circumference of the annular holding segment 111. This enables the annular holding segment 111 to allow slight, flexible and in particular elastic movements of the contact elements 114 in the radial direction, whereby the frictional or holding force resulting from the frictional fit between the contact fields 114 and the inner circumferential wall 103 can be well defined.

As can best be seen from FIG. 3, a notch or recess which prevents material from accumulating at the transition from the projection 112 to the holding segment 111 is formed on the outer circumference of the holding segment 111 where each of the projections 112 opens into the holding segment 111. This also prevents the holding segment 111 from resting against the inner circumferential wall 103 at these points.

The inner diameter of the accommodating space 14b is larger than the outer diameter of the closing body 102. The inner diameter of the valve seat 101 at the transition from the valve seat 101 to the segment 14c of the fluid channel 14 situated between the pump chamber 15 and the valve seat 101 is smaller than the outer diameter of the closing body and/or smaller than the inner diameter of the holding segment 111. The closing body 102 can be moved freely back and forth in the accommodating space 14b between a position in which it rests against the valve seat 101 and a position in which it rests against the closing body holder 110. The closing body 102 is therefore arranged without being spring-loaded. The valve arrangement 100 is designed as a valve or reflux valve with no spring.

The closing body 102 is configured to prevent a fluid flow in the second direction in a position in which it rests against the valve seat 101, in particular along a circumferential, annular line of contact, and to allow a fluid flow in the first direction when the closing body 102 is at least partially lifted off the valve seat 101. When fluid is delivered from the pump chamber 15 to the outlet opening 14a, the closing body 102 is lifted off the valve seat 101 by the fluid-dynamic forces. If fluid is supposed to flow in the opposite direction, the closing body 102 is moved against the valve seat 101 by the fluid-dynamic forces, thus blocking a fluid flow in the second direction.

For its assembly, the closing body 102 is inserted into the accommodating space 14b. The closing body holder 110 is then inserted into the closing body holder receptacle 104 and held there in a frictional fit. This prevents the closing body 102 from falling out of the accommodating space 14b. The frictional fit is dimensioned such that the forces acting on the closing body 102 and the closing body holder 110 while the delivery pump 10 is being transported and/or assembled are not sufficient to move the closing body holder 110 relative to the housing 18.

The delivery pump 10 can then be fastened to the housing 120, in particular screwed on by means of a plurality of threaded bolts. A gasket 105, in particular an annular gasket, is inserted between the housing 18 and the housing 120. The gasket 105 circumferentially or annularly surrounds the region between the outlet opening 14a and the inlet opening 122, such that this region is sealed off from the outside.

Before the pump 10 is put into operation for the first time, there is an axial gap between the closing body holder 110 and the housing 120. The fluid-dynamic forces acting on the closing body 102 and the closing body holder 110 while the pump 10 is in operation can move the closing body holder 110 in the first direction from a first holding position, in which it is held on the inner circumferential wall 103 of the fluid channel 14 in a frictional fit, into a second holding position in which the closing body holder 110 abuts or rests against the housing 120, in particular axially, whereby a movement of the closing body holder 110 in the first direction is blocked by the housing 120, in particular in a positive fit. The distance which the closing body holder 110 travels from the first holding position to the second holding position corresponds to the gap width of the axial gap which initially exists between the closing body holder 110 and the housing 120.

In the second holding position, the closing body holder 110 continues to be held on the inner circumferential wall 3 in a frictional fit, thus preventing the closing body holder 110 from moving from the second holding position back into the first holding position.

The closing body holder 110 is easy to manufacture and assemble. This results in a valve arrangement which minimizes sources of error during assembly and can conversely be manufactured very cost-effectively.

LIST OF REFERENCE SIGNS 10 delivery pump, pump
11 delivery element
14 fluid channel
14a outlet opening
14b accommodating space
14c segment
15 pump chamber
18 first housing
20 electric motor
100 valve arrangement
101 valve seat
102 closing body
103 inner wall, inner circumferential wall
104 closer body holder receptacle
105 gasket
110 closing body holder
111 holding segment
112 projection
113 recess
114 contact element, in particular contact field or contact projection
120 separate component/second housing/gear housing
121 fluid channel
122 inlet opening

The invention claimed is:

1. A valve arrangement, adapted to allow a fluid flow in a first direction and to block it in a second direction which is opposite to the first direction, wherein the valve arrangement comprises:
    a fluid channel, a valve seat and a closing body which is arranged in the fluid channel and is for example rotationally symmetrical or spherical, wherein the closing body is configured to prevent a fluid flow in the second direction in a position in which it rests against the valve seat and to allow a fluid flow in the first direction when the closing body is lifted off the valve seat;
    a closing body holder which is arranged in the fluid channel and configured to restrict a movement of the closing body in the first direction in a position of the closing body in which the closing body is lifted off the valve seat,
    wherein the closing body holder is held on an inner circumferential wall of the fluid channel in a frictional fit or in a surmountable positive fit and/or can be moved in the first direction in a position in which the closing body holder is held on an inner circumferential wall of the fluid channel, and
    wherein the frictional fit or the surmountable positive fit between the inner circumferential wall and the closing body holder is configured such that the force required to surmount the frictional fit or the positive fit is smaller than a force which is or can be exerted on the closing body by the fluid flow in the fluid channel.

2. The valve arrangement according to claim 1, wherein the closing body holder is configured for a fluid flow to flow through it.

3. The valve arrangement according to claim 2, wherein the closing body rests against the closing body holder when the closing body holder restricts or blocks the movement of the closing body.

4. The valve arrangement according to claim 1, wherein the closing body rests against the closing body holder when the closing body holder restricts or blocks the movement of the closing body.

5. The valve arrangement according to claim 4, wherein the closing body can be freely moved between its position in which it rests against the valve seat and its position in which it rests against the closing body holder.

6. The valve arrangement according to claim 1, wherein the closing body does not rest against the closing body holder or is without any mechanical interaction with the closing body holder when the closing body is in the position in which it rests against the valve seat.

7. The valve arrangement) according to claim 1, wherein the closing body is arranged without being spring-loaded, or the valve arrangement is designed as a reflux valve with no spring.

8. The valve arrangement according to claim 1, wherein the closing body holder can be moved in the first direction from a first holding position, in which it is held on the inner circumferential wall of the fluid channel in a frictional fit or a surmountable positive fit, into a second holding position in which a movement of the closing body holder in the first direction is blocked.

9. The valve arrangement according to claim 8, wherein the distance which the closing body can be moved from the position in which it rests against the valve seat to a position in which the closing body rests against the closing body holder is larger in the second holding position than in the first holding position.

10. The valve arrangement according to claim 8, wherein in the second holding position, the closing body holder is held in a frictional fit on the inner circumferential wall of the fluid channel and/or in a positive fit on the inner circumferential wall of the fluid channel or a component which is separate from the inner circumferential wall of the fluid channel and on which the closing body holder is supported in the first direction.

11. The valve arrangement according to claim 1, wherein the closing body holder has an annular holding segment, using which the closing body holder is held on the inner circumferential wall of the fluid channel in a frictional fit or a surmountable positive fit, wherein one or more projections protrude inwardly from an inner circumference of the annular holding segment.

12. The valve arrangement according to claim 11, wherein the inwardly protruding projections are connected to one another in the region enclosed by the annular holding segment.

13. The valve arrangement according to claim 12, wherein the closing body rests against the one or more projections when the closing body holder restricts or blocks the movement of the closing body, and/or on the side facing the valve seat, the one or more projections form a recess in which the closing body can be partially accommodated.

14. The valve arrangement according to claim 11, wherein the closing body rests against the one or more projections when the closing body holder restricts or blocks the movement of the closing body, and/or on the side facing the valve seat, the one or more projections form a recess in which the closing body can be partially accommodated.

15. The valve arrangement according to claim 11, wherein an outer circumference of the annular holding segment has a plurality of contact elements, which are distributed over the circumference and hold the annular holding segment in frictional-fit or surmountable positive-fit contact with the inner circumferential wall.

16. A valve arrangement, adapted to allow a fluid flow in a first direction and to block it in a second direction which is opposite to the first direction, wherein the valve arrangement comprises:
  a fluid channel, a valve seat and a closing body which is arranged in the fluid channel and is for example rotationally symmetrical or spherical, wherein the closing body is configured to prevent a fluid flow in the second direction in a position in which it rests against the valve seat and to allow a fluid flow in the first direction when the closing body is lifted off the valve seat;
  a closing body holder which is arranged in the fluid channel and configured to restrict a movement of the closing body in the first direction in a position of the closing body in which the closing body is lifted off the valve seat,
  wherein the closing body holder is held on an inner circumferential wall of the fluid channel in a frictional fit or in a surmountable positive fit and/or can be moved in the first direction in a position in which the closing body holder is held on an inner circumferential wall of the fluid channel, and
  wherein the frictional fit between the inner circumferential wall and the closing body holder is configured such that the force required to surmount the frictional fit or the surmountable positive fit is greater than the sum of the weight forces of the closing body holder and the closing body.

17. A delivery pump, comprising:
  a valve arrangement adapted to allow fluid flow in a first direction and to block it in a second direction which is opposite the first direction, wherein the valve arrangement comprises:
  a fluid channel, a valve seat and a closing body which is arranged in the fluid channel and is for example rotationally symmetrical or spherical, wherein the closing body is configured to prevent a fluid flow in the second direction in a position in which it rests against the valve seat and to allow a fluid flow in the first direction when the closing body is lifted off the valve seat;
  a closing body holder which is arranged in the fluid channel and configured to restrict a movement of the closing body in the first direction in a position of the closing body in which the closing body is lifted off the valve seat,
  wherein the closing body holder is held on an inner circumferential wall of the fluid channel in a frictional fit or in a surmountable positive fit and/or can be moved in the first direction in a position in which the closing body holder is held on an inner circumferential wall of the fluid channel;
  a pump chamber and a delivery element which can be rotated about an axis of rotation and which is arranged in the pump chamber, wherein fluid can be delivered from the pump chamber to an outlet opening via the fluid channel which for example opens into or up to the pump chamber at one end and onto the outlet opening at the other end, wherein the valve arrangement is arranged in the fluid channel or is at least partially formed by the fluid channel, and
  the delivery pump further comprising a first housing, which forms the fluid channel, namely a first fluid channel, and a second housing to which the first housing is fastened, wherein the second housing has a second fluid channel comprising an inlet opening which is arranged in accordance with the outlet opening of the first fluid channel, wherein the closing body holder can be moved in the first direction from a first holding position, in which it is held on the inner circumferential wall of the first fluid channel in a frictional fit, into a second holding position in which a movement of the closing body holder in the first direction is blocked because the closing body holder rests axially against the second housing.

18. The delivery pump according to claim 17, wherein the valve seat is formed by the fluid channel or is inserted into the fluid channel.

* * * * *